United States Patent [19]

Tada et al.

[11] Patent Number: 5,114,748
[45] Date of Patent: May 19, 1992

[54] METHOD OF PREPARING OR RUBBING A SUBSTRATE TO BE USED IN A LCD DEVICE BY SPRAYING IT WITH UNIFORMLY SIZED DROPLETS OR FROZEN WATER

[75] Inventors: Masuo Tada, Yao; Hiroi Takahiko, Osaka; Takaaki Fukumoto, Itami; Toshiaki Ohmori, Itami; Itaru Kanno, Itami, all of Japan

[73] Assignees: Taiyo Sanso Co. Ltd.; Mitsubishi Denki Kabushiki Kaisha, both of Japan

[21] Appl. No.: 647,478

[22] Filed: Nov. 29, 1990

[30] Foreign Application Priority Data

Dec. 8, 1989 [JP] Japan .................. 1-320179

[51] Int. Cl.⁵ .................. B05D 1/12; C09K 19/56
[52] U.S. Cl. .................. 427/180; 428/1; 427/421; 427/444
[58] Field of Search .................. 428/1; 427/180, 421, 427/444

[56] References Cited

U.S. PATENT DOCUMENTS 4,932,168 6/1990 Tada et al. .................. 51/436
4,974,375 12/1990 Tada et al. .................. 51/413

FOREIGN PATENT DOCUMENTS 63-96630 4/1988 Japan .

OTHER PUBLICATIONS

Geary et al., "The Mechanism of Polymer Alignment of Liquid-Crystal Materials", Journal of Applied Physics, vol. 62, No. 10, Nov. 1987, pp. 4100-4108.
Dixon et al., "Alignment Mechanism in Twisted Nematic Layers", Applied Physics Letters, vol. 24, No. 2, Jan. 1974, pp. 47-49.
Matsuura et al., "Interaction Between Liquid Crystals and Treated Solid Surfaces; Single Crystallization", Tokyo University, Aug. 1983, pp. 132-139.

Primary Examiner—Shrive Beck
Assistant Examiner—Benjamin L. Utech
Attorney, Agent, or Firm—Leydig, Voit & Mayer

[57] ABSTRACT

A method in which a liquid is sprayed through a nozzle to form minute droplets of substantially uniform size. These uniform droplets are sprayed into and frozen by a refrigeration medium, such as liquid nitrogen, to form uniform diameter frozen particles. The frozen particles are ejected onto the surface of a substrate used in a liquid crystal display device to orient the liquid crystal material applied to the surface.

8 Claims, 2 Drawing Sheets

REFRIGERATION MEDIUM

HIGH-PRESSURE GAS

BLAST NOZZLE 30

METHOD OF PREPARING OR RUBBING A SUBSTRATE TO BE USED IN A LCD DEVICE BY SPRAYING IT WITH UNIFORMLY SIZED DROPLETS OR FROZEN WATER

BACKGROUND OF THE INVENTION

1. Field of the Invention

The present invention relates to a method of treating the surface of a substrate for a liquid crystal display device.

2. Description of The Related Art

FIG. 3 shows a conventional method for treating the surface of a substrate for a liquid crystal display device as disclosed in Japanese Published Patent Application 63-96630. As shown in FIG. 3, finely pulverized ice particles 7 are ejected by a blast nozzle 2 onto a film disposed on a glass substrate 5 for orienting a liquid crystal material. This glass substrate 5 is secured to a table 6 in a cabinet 4 having an exhaust duct 3. Under high pressure, the blast nozzle 2 ejects the ice particles 7 with the aid of a high-pressure gas 1 which is compressed air or high-pressure nitrogen. The ice particles 7 thus ejected are received by a hopper 8 and are again supplied to the blast nozzle 2.

Treatment of the surface of a substrate for a liquid crystal display device in accordance with the conventional method is performed as described above by pulverizing a large block of ice to form small ice particles. Formation and pulverization of a large block of ice is inefficient and leads to the following problems. When a machine is provided to pulverize the ice, this machine must be kept cool, increasing costs. Furthermore, it is very difficult to obtain, by means of mechanical pulverization, ice particles of uniform diameter. In addition, during pulverization, dust is mixed with the ice particles.

SUMMARY OF THE INVENTION

The present invention has been made to overcome these problems. Accordingly, an object of the invention is to provide a low-cost method of treating the surface of a glass substrate for a liquid crystal display device with ice particles of uniform diameter that are free of dust from the process of manufacturing the ice particles.

In order to achieve the above object, there is provided a method of treating the surface of a substrate for a liquid crystal display device comprising dividing a liquid into droplets, the droplets having a substantially uniform size, by spraying; forming frozen particles, each having a substantially uniform diameter, by heat exchange between the droplets of the liquid and a refrigeration medium; and ejecting, at a desired angle, the frozen particles onto the surface of the substrate.

In the present invention, a spray nozzle is used to form the uniform droplets or the liquid is evaporated.

DESCRIPTION OF THE PREFERRED EMBODIMENTS

Figure 1:
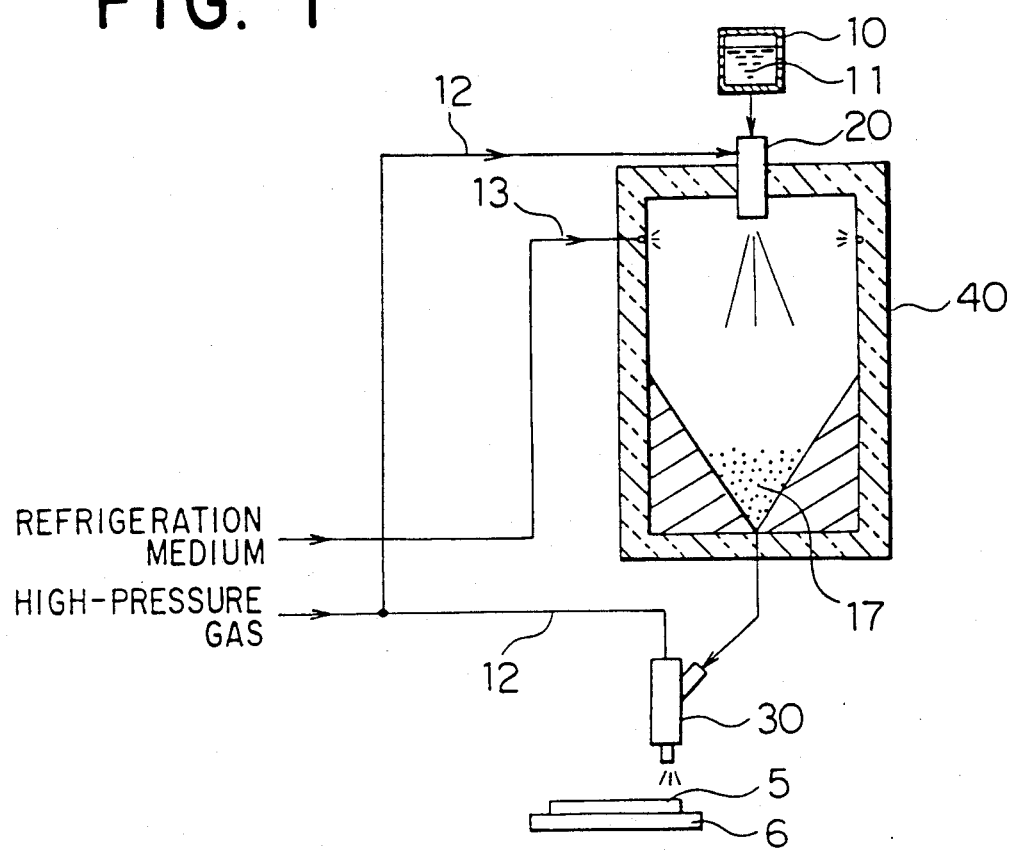
FIG. 1 is a schematic illustration of a method according to the present invention.

FIG. 1 is a schematic illustration of a method in accordance with the present invention. A liquid 11, for example, ultrapure water, is stored in a storage tank 10. A thermally insulated container 40 is cooled by a refrigeration medium, such as liquid nitrogen 13. When a spray nozzle 20 is used to spray ultrapure water 11 into the insulated container 40, frozen particles 17 of ultrapure water 11 are formed by means of a heat exchange between the ultrapure water 11 and the liquid nitrogen 13. High-pressure gas, such as nitrogen gas 12, is used to propel this spray. For example, when ten times as much nitrogen as ultrapure water is supplied, the ultrapure water is turned into minute particles. The diameter of the frozen particles 17 can be altered by altering the ratio of the ultrapure water and the nitrogen gas supplied to the spray nozzle 20. Frozen particles 17, each having a diameter of 5 mm $-20$ $\mu$m, are obtained using the above method. Nitrogen 12 is fed to a blast nozzle 30 in the same manner as to the spray nozzle 20. The frozen particles 17 thus obtained are drawn to the blast nozzle 30 and are ejected by the blast nozzle 30 onto a surface of a substrate 5 for a liquid crystal display device for orienting a liquid crystal material subsequently applied to the surface. The substrate 5 is secured to a table 6.

Figure 2:
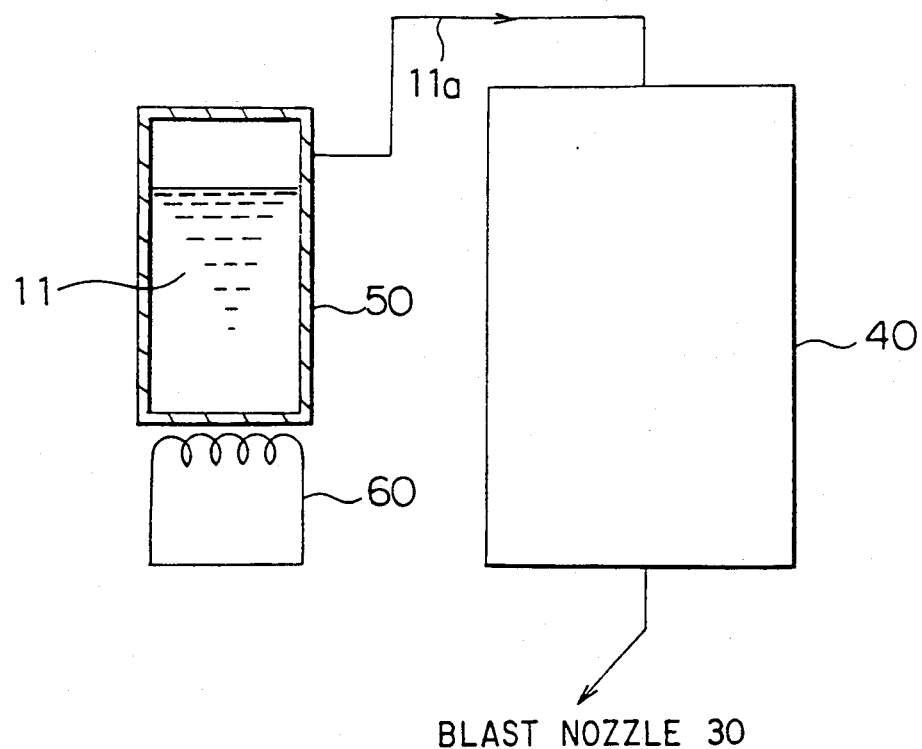
FIG. 2 is a schematic illustration of a method accordance to the invention.
Figure 3:
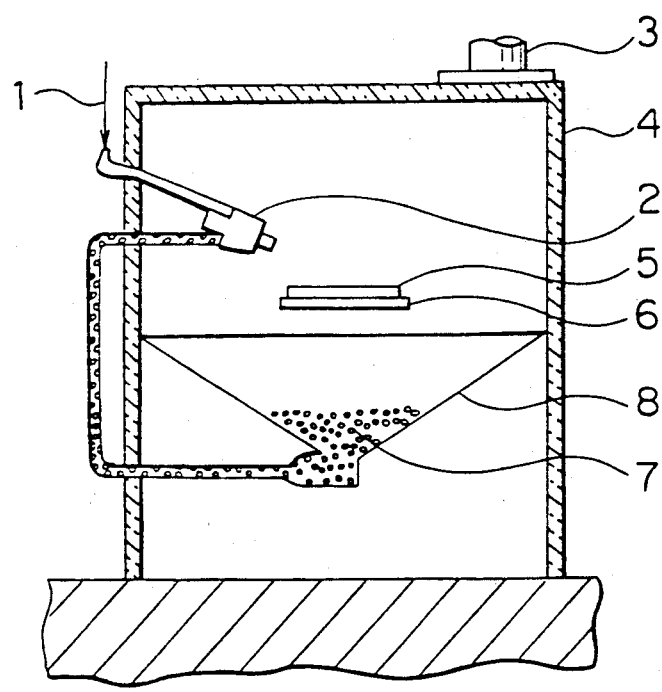
FIG. 3 is a schematic illustration of a conventional substrate treating method.

FIG. 2 is a schematic illustration of another embodiment of a method in accordance with the present invention. In this embodiment, a liquid, ultrapure water 11, is stored in a pressure tank 50. A heating means, such as heater 60, is used to heat and evaporate the ultrapure water. The steam 11a so produced is introduced into an insulated container 40 and is directly cooled. Extremely minute frozen particles, each having a diameter of 20 $\mu$m or less are thus obtained by freezing the water vapor.

As has been described above, according to the method of the present invention, ultrapure water is turned into ice after it has been first turned into minute droplets by spraying or the like or into steam. In this process, there is no energy loss as in mechanical pulverization of large bodies of ice. Furthermore, since no dust is mixed with the frozen particles and since ice particles having uniform diameters are obtained, a substrate surface is uniformly cleaned and treated. Moreover, although frozen particles having diameters of several mm have been hitherto obtained, the present invention uses minute particles, each having a diameter of 5 mm or less. This results in good orientation of the liquid crystal material and cleaning of the substrate surface.

In the foregoing description, although nitrogen gas is used for spraying ultrapure water and for ejecting the frozen particles, the gas is not limited to nitrogen. For example, compressed air may also be used. The liquid is not limited to ultrapure water.

As has been described above, the present invention makes it possible to treat uniformly and clean the surface of a substrate for establishing the orientation of a liquid crystal material applied to the surface for a liquid crystal display device.

What is claimed is:

1. A method of treating a surface of substrate for a liquid crystal display device for orienting a liquid crystal material applied to the surface comprising:

spraying a liquid to form droplets having a substantially uniform size;

freezing the droplets to form frozen particles, each particle having substantially the same diameter, by heat exchange between the droplets and a refrigeration medium; and ejecting, at a desired angle, the frozen particles onto the surface of a substrate for a liquid crystal display device to orient a liquid crystal material applied to the surface.

2. The method according to claim 1 including spraying the liquid through a nozzle.

3. The method according to claim 2 including forming frozen particles having a substantially uniform diameter within the range 5 mm -20 μm, including determining the diameter of the particles by altering the ratio of the liquid to the high-pressure gas supplied to said spray nozzle.

4. The method according to claim 3 wherein said liquid is ultrapure water.

5. The method according to claim 4 wherein said refrigeration medium is liquid nitrogen.

6. The method according to claim 5 wherein the high-pressure gas is nitrogen gas.

7. The method according to claim 5 wherein the high-pressure gas is compressed air.

8. A method of treating a surface of a substrate for a liquid crystal display device for orienting a liquid crystal material applied to the surface comprising:

heating a liquid stored in a pressure tank to form a vapor;

freezing the vapor to form frozen particles, each particle having substantially the same diameter, by heat exchange between the vapor and a refrigeration medium; and ejecting, at a desired angle, the frozen particles onto the surface of a substrate for a liquid crystal display device to orient a liquid crystal material applied to the surface.

* * * * *